United States Patent [19]

Klebba et al.

[11] 3,708,192
[45] Jan. 2, 1973

[54] SLIDING DOOR ARRANGEMENT FOR MOTOR VEHICLES

[75] Inventors: Horst Klebba, Weyhausen; Ernst Maneck, Tappenbeck, both of Germany

[73] Assignee: Volkswagenwerk Aktiengesellschaft, Wolfsburg, Germany

[22] Filed: July 12, 1971

[21] Appl. No.: 161,634

[30] Foreign Application Priority Data

Aug. 7, 1970 Germany.....................P 20 39 237.4

[52] U.S. Cl. .................292/261, 49/449, 296/146, 296/155, 49/218
[51] Int. Cl. ............................................E05c 19/00
[58] Field of Search......292/277, 261, 64, 65, 95, 99, 292/100, 269; 49/220, 218, 449; 16/163, 164, 166; 296/146, 155, 147

[56] References Cited

UNITED STATES PATENTS

| | | | |
|---|---|---|---|
| 3,608,957 | 9/1971 | Maneck | 292/146 |
| 704,846 | 7/1902 | Lydon | 49/216 |
| 3,400,974 | 9/1968 | Gage | 296/146 |

FOREIGN PATENTS OR APPLICATIONS

| | | | |
|---|---|---|---|
| 858,929 | 12/1952 | Germany | 296/155 |

Primary Examiner—Marvin A. Champion
Assistant Examiner—Robert A. Hafer
Attorney—Ernest F. Marmorek

[57] ABSTRACT

In a motor vehicle, a sliding door compartment and latching mechanism therefor comprising a pivot arm coupled by a hinge in a rotatable fashion to the sliding door arrangement about a vertical axis, the pivot arm having a free end on which a roller carriage is mounted for running in a horizontally placed guiding rail when such siding door is opened or closed, a guiding arch member on the guiding rail means facing the inner space of the vehicle, said guiding arch means being provided at an end portion of the guiding rail means which is away from the door opening, boss-like projection provided on the pivot arm in the region of the hinge, a latching member mounted behind the boss for preventing an unintended closing of the sliding door arrangement, a spring means biasing the latching member, whereby an unintended closing of the sliding door is prevented when the pivot arm has been brought into an angular position by means of the roller carriage being rolled into the guide arch, which angular position of the pivot arm corresponds to an open position of the sliding door.

6 Claims, 3 Drawing Figures

PATENTED JAN 2 1973  3,708,192

INVENTORS:
HORST KLEBBAN
BY ERNST MANECK

THEIR ATTORNEY.

SLIDING DOOR ARRANGEMENT FOR MOTOR VEHICLES

FIELD OF THE INVENTION

The present invention relates generally to a sliding door arrangement for motor vehicles, and more particularly it relates to a sliding door arrangement having a novel latch mechanism wherein a pivot arm is supported on the sliding door in a pivotable fashion about a vertical axis and such pivot arm on its free end carries a roller carriage which runs over a horizontally placed guiding rail which is provided with a guide arch facing the inside of the vehicle. Such latching device serves to open or close a sliding door either during its swinging in and out or by means of a parallel displacement thereof.

BACKGROUND OF THE INVENTION

It has been known in connection with the sliding doors in motor vehicles to provide a special latching hook or a similar device which starts to function when the door is opened and prevents an unintended closing of the door. During the closing of the door by operating the door handle, the latching hook simultaneously becomes lifted off and thereby the door latching is released. Such latching mechanisms are, however, too complicated and due to their projecting parts may present a potential cause for injuring a person in case of an accident.

BRIEF SUMMARY OF THE INVENTION

It is, therefore, an object of the present invention to provide a sliding door for a motor vehicle having a simple latching mechanism which makes the hitherto known latching mechanisms used to prevent the closing of an open door superfluous as it successfully replaces them.

In accordance with the present invention in a latching mechanism for a sliding door of the above-described type, a guide arch is provided on the side of the guide rail opposite to the door opening, and the pivot arm in the region of the hinge is provided with a boss-like projection behind which a latching mechanism exposed to the effect of a spring is placed to prevent an unintended closing of the opened sliding door when the pivot arm is in an angular position associated with an open position of the sliding door, such angular position of the pivot arm being brought about by means of the roller carriage which assumed position in the guiding arch member.

In a preferred embodiment of the present invention the boss-like projection is formed by a catch member provided on the backside of the hinge member of the pivot arm. An especially space-saving construction is attained in that a strap member provided on the hinge has a recess formed therein running transversely to the axis of rotation and into which the latching member is placed, such latching member being in the form of a slider. In this embodiment the strap member as well as the slider may have a longitudinal slot lying on an equal level into which a coil spring is mounted on a tongue piece formed on the slider and/or strap member and wherein the slider or latching member is retained on the strap member by means of an angular piece protruding in an engaging fashion through a slot.

In accordance with a further feature of the present invention the guide arch runs into a buffer or bock means which is provided with a slant surface corresponding with a guide on the roller carriage. The buffer means can be made of rubber or of a similar material which can brake the movement of the sliding door proceeding into the opening direction.

BRIEF DESCRIPTION OF THE DRAWING

The invention will become more readily apparent from the following description of a preferred embodiment thereof shown, by way of example, in the accompanying drawing, in which.

DESCRIPTION OF THE PREFERRED EMBODIMENT

Figure 1:
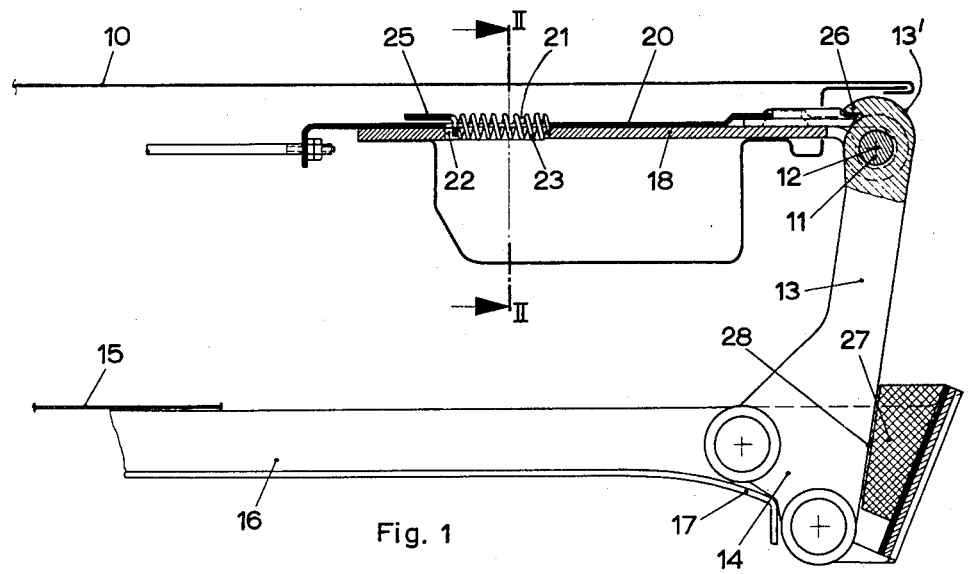
FIG. 1 is a partial sectional view of an opened sliding door illustrating the latching mechanism according to the present invention in a plan view.
Figure 2:
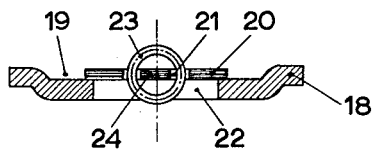
FIG. 2 is a cross sectional view taken along the line II—II of FIG. 1, on an enlarged scale, however.
Figure 3:
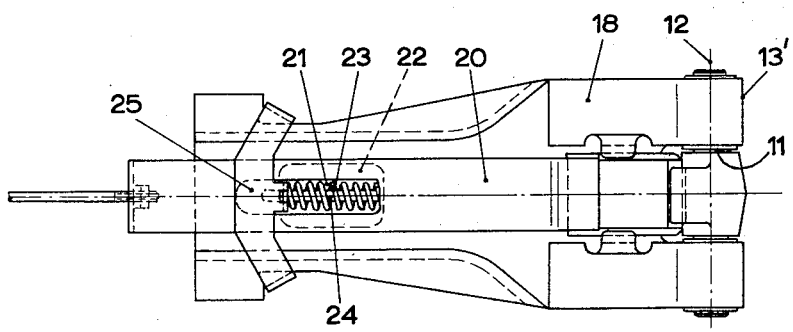
FIG. 3 is a side view of the latching mechanism according to the present invention as viewed from the right of FIG. 1.

With reference to the figures it is seen that on a sliding door 10 a pivot arm 13 is mounted by means of a hinge 11 for rotation about a vertical axis 12, which pivot arm 13 on its free end carries a roller carriage 14 running in a horizontally placed guiding rail 16 provided on the vehicle wall 15. The guiding rail 16 on its end opposite to the door opening (not shown in the drawing) carries a guide arch 17 facing or directed to the inside of the vehicle.

A strap member 18 serving to secure the hinge 11 to the sliding door 10 has a recess 19 formed therein passing vertically with respect to the axis of rotation 12 and into which recess 19 a latching mechanism formed as a slider is mounted or embedded. In addition, the strap member 18, and also the slider 20, has a longitudinal slot 21, 22, respectively, formed on a similar level. In these longitudinal slots 21, 22 a coil-shaped compression spring 23 is mounted which is secured in place by means of a tongue piece 24 formed on the slider 20 and which protrudes into the coil spring 23. An angular piece 25 passing in an engaging fashion through the longitudinal slot 21 of the slider 20 prevents the slider 20 from falling out from the recess 19.

Inasmuch as the slider 20 is spring biased in the direction of the hinge 11, it engages there (as seen in FIG. 1) a boss or projection 26 formed as a catch member on the backside 13' of the hinge of the pivot arm 13 as soon as the pivot arm 13 is brought into an angular position corresponding to an open sliding door position by means of the roller carriage 14 which runs into the guide arch 17. By pulling back the slider 20 the latching action is released.

In the region of the guide arch 17 there is a rubber buffer means or bock 27 provided in such a manner that a run-up slant surface 28 formed thereon will not only slow down or brake the motion of the roller carriage 14, but also supports its arch-like guide.

From the above, it is apparent that although the invention has been described hereinbefore with respect to a certain specific embodiment thereof, it is evident that many modifications and changes may be made without departing from the spirit of the invention. Accordingly, by the appended claims, we intend to cover all such modifications and changes as fall within the true spirit and scope of this invention.

Having thus described the invention, what we claim as new and desire to be secured by Letters Patent, is as follows:

1. In a motor vehicle, a sliding door arrangement and a latching mechanism therefor comprising a pivot arm, a hinge means coupling said pivot arm in a rotatable fashion to said sliding door arrangement about a vertical axis, said pivot arm having a free end, a roller carriage being mounted on said free end, a horizontally placed guiding rail means for said roller carriage for movement thereon when said sliding door is opened or closed, a guiding arch means on said guiding rail means facing the inner space of the vehicle, said guiding arch means being provided at an end portion of said guiding rail means which is away from the door opening, a boss means provided on said pivot arm in the region of said hinge means, a latching member mounted with relation to said sliding door and adapted to engage said boss means for preventing an unintended closing of said sliding door arrangement, spring means biasing said latching member, whereby an unintended closing of said sliding door is prevented when the pivot arm has been brought into an angular position by means of said roller carriage being rolled into said guide arch, which angular position of said pivot arm corresponds to an open position of said sliding door.

2. The combination as claimed in claim 1, wherein said boss means comprises a pawl or catch member provided on the backside of the pivot arm.

3. The combination as claimed in claim 1, wherein a strap member is provided on said hinge means, said strap member having formed therein a recess running transversely with respect to the axis of rotation, said latching member being movably mounted in said recess.

4. The combination as claimed in claim 3, wherein said latching member is in the form of a slider member.

5. The combination as claimed in claim 3, wherein said strap member and said latching member have each formed therein a longitudinal slot lying on the same level into which a coil spring means is mounted on a member formed on said latching member, an angular member passing through said longitudinal slot in said latching member retaining said latching member on said strap member.

6. The combination as claimed in claim 1, wherein a buffer means is provided adjacent said guide arch, said buffer means having a slant surface for guiding said roller carriage.

* * * * *